Dec. 29, 1925.

P. JONES

CANE

Filed July 24, 1924

1,567,322

INVENTOR:
Paul Jones
BY Allen & Allen
ATTORNEYS.

Patented Dec. 29, 1925.

1,567,322

UNITED STATES PATENT OFFICE.

PAUL JONES, OF CINCINNATI, OHIO.

CANE.

Application filed July 24, 1924. Serial No. 727,872.

*To all whom it may concern:*

Be it known that I, PAUL JONES, a citizen of the United States, and a resident of Cincinnati, in the county of Hamilton and State of Ohio, have invented certain new and useful Improvements in Canes, of which the following is a full, clear, and exact description, reference being had to the accompanying drawing, forming part of this specification.

My invention relates to canes, and more particularly to a novelty device wherein a cane is employed together with a toy balloon for decoration, for use in carnivals and the like.

It is my object to provide a device which to all outward appearance resembles an ordinary cane, or walking stick, and is made to contain concealed within the head, a rubber balloon, which is demountable, but inflatable without removing from the cane, whereupon it projects in a sphere or other shape from the head of the cane.

It is readily appreciated that as a souvenir, novelty, favor at dances, and plaything at carnivals and the like, the device of my invention has a valuable purpose.

I accomplish my objects by that certain construction and arrangement of parts to be hereinafter more specifically pointed out and claimed.

Figures 1, 2:
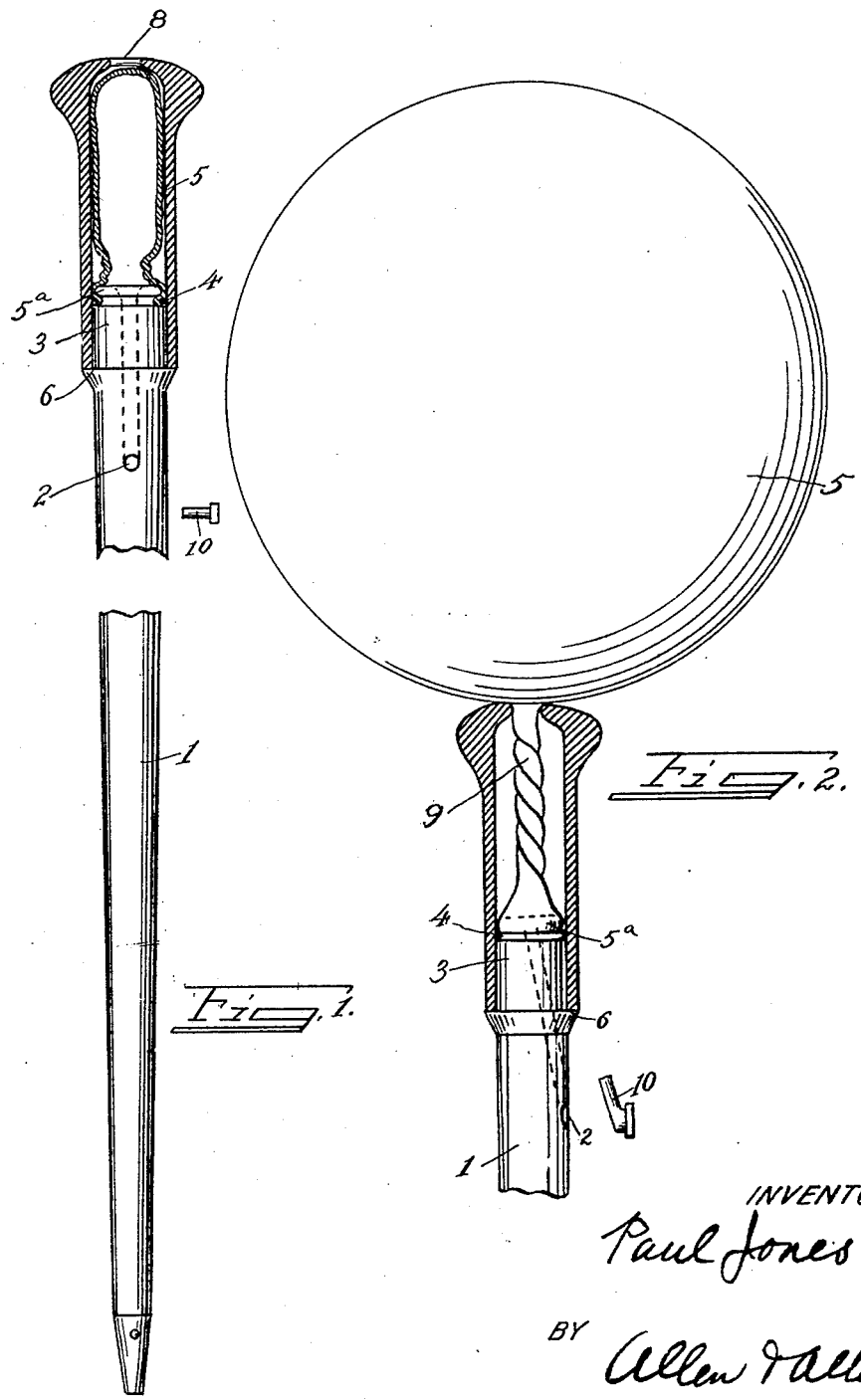
Figure 1 is a side elevation of a cane showing the head in section, with the balloon within the head.
Figure 2 is a section of the head with the balloon inflated.

The cane may be made with a shaft 1 of any desired material, and in a wide range of shapes. In the shaft of the cane is a blow hole 2, which passes from a point near the top of the shaft to a balloon retaining tip 3 of the shaft. This tip has a channel 4 circumferential thereof, around which the beaded mouth 5ª of the balloon 5 is set.

It is evident that balloons may be easily put onto this tip and removed therefrom, and that by blowing through the hole, air will pass up through the end of the tip and fill the balloon which is secured with its beaded mouth in the channel of said tip.

The head of the cane is formed of any desired material, but preferably of wood, solid rubber, or a composition. The shaft of the cane is formed with a shoulder 6 just below the balloon retaining tip, and the head 7 is hollow and arranged to fit snugly over the balloon retaining tip. The head is removable as it will readily slide on and off of the shaft.

The balloon, as shown in Figure 1, should be such that it can be brought within the compass of the inside of the head, and is to be stuffed down into the inside of the head when deflated. By removing the balloon through the hole at top of the cane, and blowing through the blow-hole, the balloon will be inflated.

When the balloon is inflated, the neck 9 thereof should be twisted, and the frictional engagement of the balloon with the head of the cane will prevent the balloon from untwisting, so that the air will be imprisoned within the balloon and it will remain inflated.

I have suggested that the head be made of solid rubber, since this will be of permanent, smooth nature, and will give proper frictional resistance to the rubber of the inflated balloon to hold it in inflated condition after being twisted.

A smooth fitting plug 10 could also be used to close the blow hole, instead of, or in addition to twisting the balloon neck, in holding the air within the balloon.

It will be apparent that the device while having the use of a walking stick, can be fitted with rubber balloons of gay colors, shapes or designs, and will provide a very interesting and amusing article.

Having thus described my invention, what I claim as new and desire to secure by Letters Patent, is:—

1. An article of manufacture comprising a cane or stick, having a shaft with a channeled end, adapted to receive the beaded mouth ring of an inflated balloon, a head in tubular form, adapted to fit over the shaft to conceal the channeled end thereof, said head projecting above the said shaft end to form a chamber for the deflated balloon, and having a mouth of less dimension than the chamber forming a narrow mouth to frictionally engage the walls of the inflated balloon and preventing the untwisting thereof, after inflation and imparting of an air retaining twist to the neck of the said balloon, and passageway means within the shaft communicating with the end thereof, for the purpose described.

2. An article of manufacture comprising a cane or stick, having a shaft, a head removable from the shaft, means on the shaft for retaining an inflatable balloon, said head being removable from the shaft, and passageway means passing through the shaft so as to communicate with the balloon, said head being hollow to conceal the balloon, and having a mouth through which the balloon will project, when inflated, of less dimension than the chamber to form a narrow mouth, said head being composed at the mouth thereof, at least, of solid rubber, whereby best frictional engagement with the balloon walls will be provided to prevent untwisting of the balloon after the neck thereof within the head has been given an air retaining twist.

PAUL JONES.